United States Patent Office

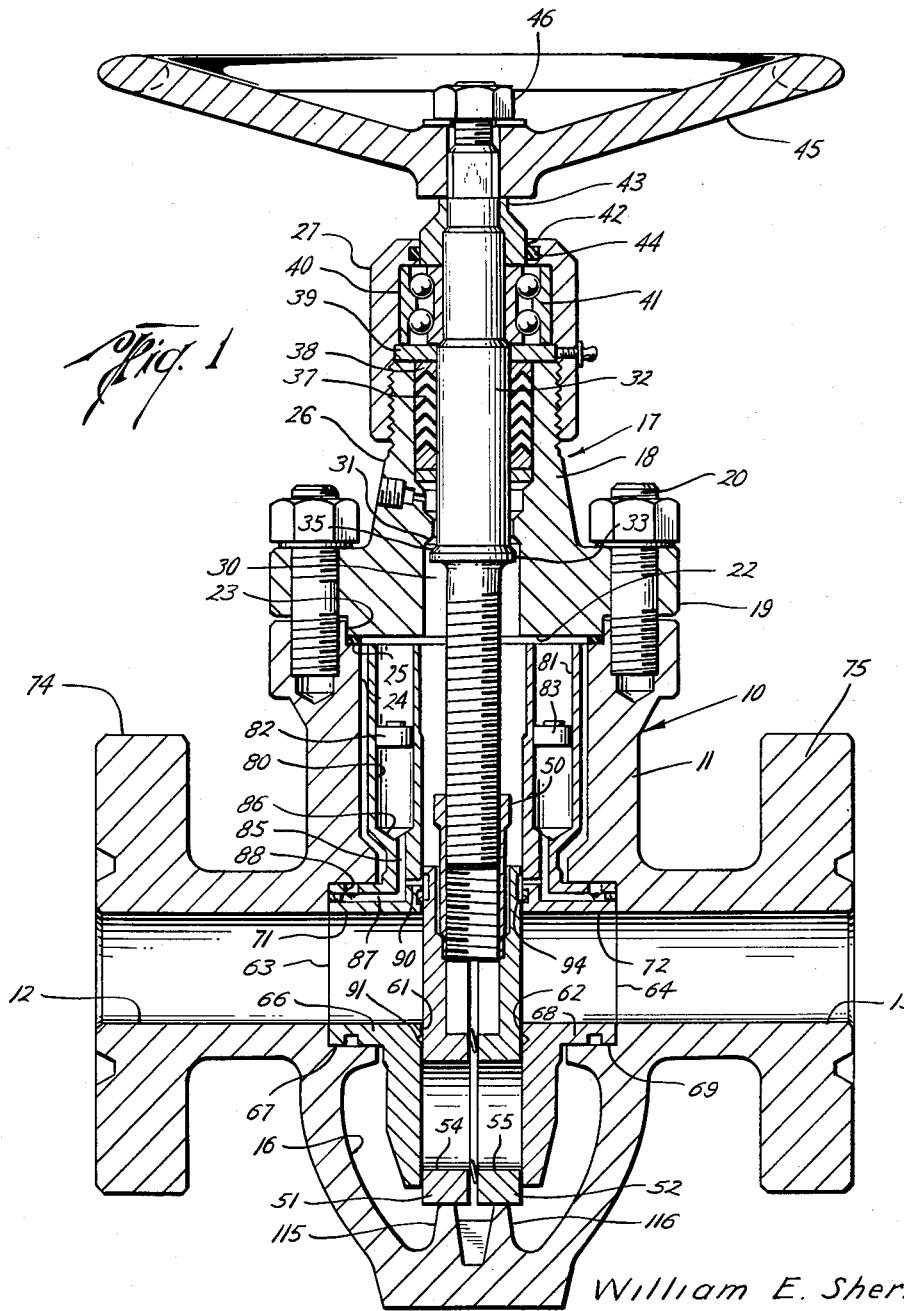

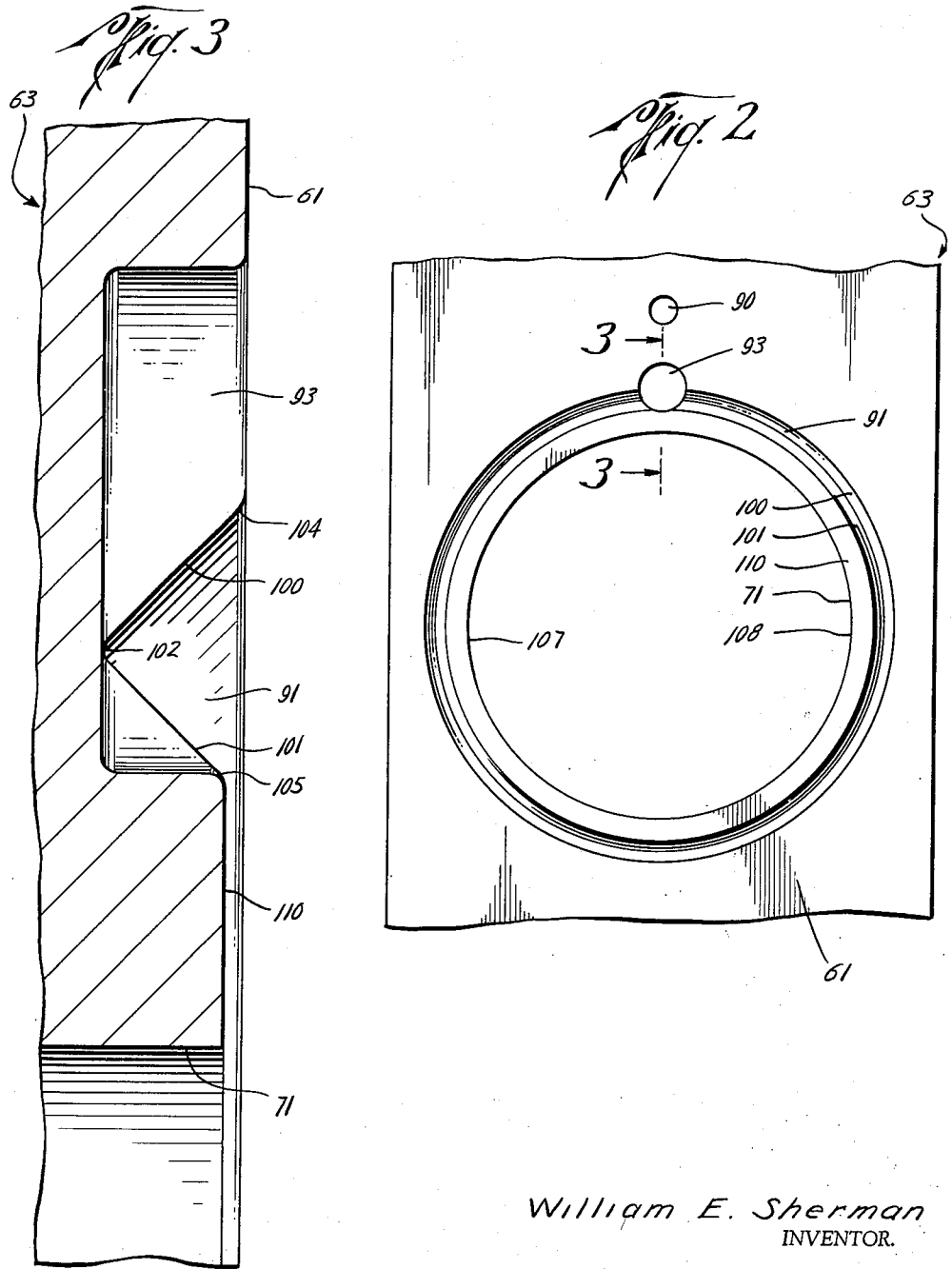

2,980,129
Patented Apr. 18, 1961

2,980,129

SEALING GROOVE

William E. Sherman, Houston, Tex., assignor, by mesne assignments, to McEvoy Company, Houston, Tex., a corporation of Texas Filed Sept. 26, 1957, Ser. No. 686,461

4 Claims. (Cl. 137—238)

This invention relates to novel sealing grooves, particularly for use in lubricated or plastic sealed valves. The valves with which the invention will be most often used are of the general type shown by United States Letters Patent Number 2,653,789, issued September 29, 1953, to Robert Eichenberg, and entitled "Valve," but the present invention can be equally suitably used in other types of valves and in other pressure sealing applications.

A principal object of the invention is to provide, particularly for use in automatic plastic sealed valves, a novel sealing groove system having a large sealing area but yet having a small plastic sealing material volume.

Consequently, another object of the invention is to provide sealing groove systems having a large sealing area opening relative to their volume.

Another object of the invention is to provide, particularly in valve sealing applications, sealing grooves which are effective in forming fluid tight seals, are easily and readily cleaned, and which do not suffer from the disadvantages of sharp angle corners resulting in difficulty in flushing, of galling at the seat face, and of small exposed sealing area relative the groove volume.

A further object of the invention is to provide better flow of sealing material from the sealing material reservoirs in the valve to the sealing grooves, thereby, and in conjunction with the other objects, providing a valve not subject to failure because of inadequate sealing and consequent leakage.

Other objects and advantages will appear from the following description of the invention, including a description of a preferred embodiment thereof, reference being made to the accompanying drawings showing the preferred embodiment, of which:

Figure 1 is a vertical cross section of the preferred embodiment taken through the center of the valve;

Figure 2 is an enlarged partial elevation of the gate engaging face of one of the seats; and, Figure 3 is a partial vertical section taken at line 3—3 of Figure 2.

Referring now to the drawings in detail and particularly to Figure 1, there is shown a valve 10 which is similar to the valve disclosed in the aforesaid United States Patent Number 2,653,789 to Eichenberg. Valve 10 includes a body 11 having aligned cylindrical passages 12, 13 therethrough at opposite sides of the valve chamber 16 in body 11. Valve 10 has a bonnet structure 17, the bonnet 18 having a lower circular flange 19 which is bolted to the circular upper end of body 11 by a plurality of the bolts 20. A circular projecting portion 22 at the underside of bonnet 18 fits at its edges into a circular recess 23 formed around the circular bonnet opening 24 of chamber 16, and a packing ring 25 in recess 23 forms a fluid tight seal therearound. Bonnet 18 is threaded at the upper end of cylindrical upper part 26 thereof, and a threaded cap 27 is screwed thereover. The bonnet has an axial cylindrical stem opening 30 in its lower face, and opening 30 has an inwardly and upwardly converging conical seat 31 at its upper end around the valve stem 32. Stem 32 has an outwardly projecting shoulder 33 therearound having an upwardly facing conical seat face 35 adapted to seat flush on seat 31 to close the stem opening 30 through the bonnet. Opening 30 is enlarged above seat 31 to form a recess in which a plurality of chevron packing rings 37 around stem 32 are disposed. The uppermost ring 37 is backed up by a retainer ring 38 above which is disposed a bearing ring 39 in an opening 40 of cap 27, opening 40 having an enlarged part at its lower end within which ring 39 is held against the upper end of the bonnet and against retainer ring 38. A bearing 41 is disposed about the stem within the reduced upper part of opening 40.

Cap 27 has an upper circular opening 42 in which is received the lower flared end of a sleeve 43. An O-ring seal 44 seals around the sleeve in opening 42. The upper end of sleeve 43 engages the hub of handwheel 45 which is threaded onto the upper end of stem 32 and retained by a nut 46 threaded onto the stem above the handwheel.

Stem 32 is threaded below shoulder 33 thereof. A boss 50 is threaded thereon and is also engaged between the two gate elements 51, 52, so that when stem 32 is rotated, the stem not then moving longitudinally, boss 50 is moved up or down at its threaded engagement with stem 32 to move the gates 51, 52 simultaneously up or down to open or close the valve, as will be further explained.

Gates 51, 52 have aligned cylindrical ports 54, 55, respectively, therethrough below their vertical centers, which ports are aligned with passages 12, 13 and with ports through the seats, not yet described, to open the valve when the gates are in the "up" position. The upper parts of the gates serve as sealing plates to close the valve when the gates are in their "down" position.

The gates 51, 52 are slidingly moved by stem 32 and boss 50 along the inner faces 61, 62 of seat members 63, 64 respectively, when the valve is opened or closed. Seat member 63 has tubular neck 66 which is press-fitted into a recess 67 around the inner end of passage 12. Seat member 64 has tubular neck 68 which is press-fitted into a recess 69 around the inner end of passage 13. The seats 63, 64 are held firmly in place, and with the ports 71, 72 thereof aligned with passages 12, 13 so that when the gates are "up" the flow passage through the valve is open. Gates 51, 52 fit flushly against seat faces 61, 62, respectively, to close the valve at their upper sealing plate areas when the gates are "down" as shown in Figure 1.

Body 11 has connection flanges 74, 75 at the outer ends of passages 12, 13, respectively, for connection of the valve into a flow line.

Still referring to the drawings, and now also to Figures 2–3, each seat member has an upper extension into the upper part of chamber 16 beneath the bonnet. A cylindrical sealing material reservoir 80 is formed in the extension of seat 63, and an identical cylindrical sealing material reservoir 81 is formed in the extension of seat 64. Pistons 82, 83 are sealingly and slidingly disposed in reservoirs 80, 81 to retain the sealing material in the reservoirs and to pressure sealing material from the reservoirs in response to line pressure in the valve chamber 16. The tops of the reservoirs are open and a small clearance thereabove for entry of line pressure is provided.

Each of the seat members 63, 64 is provided with sealant flow ports and sealing grooves for providing high-pressure fluid tight seals around the seat necks 66, 68 in recesses 67, 69 and around the seat passages or ports 71, 72 at seat faces 61, 62. Since the seat members and the ports and grooves thereof are identical, only one will be described, and the description and references to the drawing will be equally applicable to the other.

Describing seat member 63, a port 85 through the member extends downwardly from a side of the conical bottom 86 of reservoir 80 and terminates above port 71. A port 87 extends outwardly from the lower end of port 85 almost to the end of the seat neck 66. A sealing groove 88 is formed around seat neck 66 near the outer end of port 87 and is in communication therewith. A port 90 extends from an intermediate point of port 85 inwardly to seat face 61. A sealing groove 91, which is preferably circular, in seat face 61 surrounds the inner end of seat port 71. Groove 91 has at its upper side above the axis of port 71 and below the inner end of port 90 at seat face 61 an upwardly extending recess 93 which shortens the distance between port 90 and groove 91. A crossover groove or "jumper" 94 in the sealing plate surface at the upper outer face of gate 51 overlaps both port 90 and recess part 93 of groove 91 only when the gate is "down" and port 71 is closed by the flush seating sealing plate of the gate. In any other position of the gates the jumpers 94 of the two gate members are not aligned with one or both of ports 90 and grooves 91.

The shape of the sealing grooves 91 is different from that found in other valves of the type herein described and in other equipment wherein analogous or identical sealing groove-plastic sealant sealing systems are used. This older equipment was provided with sealing grooves of square or rectangular cross section instead of the generally triangular cross section provided according to this invention, and that equipment is to be distinguished from that now provided by the present invention and having improved performance because of the new sealing groove shape.

In valves of the type herein described, and in other equipment having similar sealing systems, one problem encountered has been plugging of the sealing grooves with extraneous matter or detritus after the equipment has been in use. This difficulty is of course more pronounced where the equipment is in use with fluids which are dirty, or which contain precipitated or precipitating impurities, or which react with or dissolve with the sealing material used in forming the seals. The sealing material is generally a dispersed suspension of a solid in a more or less fluid carrier, and the sealing material which has been most successful in connection with liquid and gaseous petroleum handling applications is a dispersed suspension of finely divided mica and/or asbestos in a polymerized caster oil carrier medium which will flow at the pressures to be encountered within the valve.

This sealing material has been found to be somewhat soluble in or with, or to otherwise react with some types of materials in connection with which the equipment is used, this being particularly evident in the case of sour petroleum liquids, vapors, and gases, and when this occurs the sealing grooves at the gate faces are likely to become filled with or plugged by a sludge or other build-up, particularly at the lower parts thereof where gravity or flow thereto can contribute to the effect. The plugging of the sealing grooves does not occur in a pronounced fashion where the sealing groove is not exposed at times, e.g. grooves 88 around the seat necks, to the line fluid or slurry. But plugging can occur in any sealing grooves, horizontally and/or vertically disposed, which are at times exposed to permit ingress of materials which may plug or form plugs in the sealing grooves. In the case of the gate valves, this exposure of the sealing grooves to line fluid occurs at each operation of the valve, and with the sour materials and where fracturing and/or cementing has been carried out through a valve, may become very pronounced.

Referring still to all of the drawings, in Figure 3 the preferred shape of sealing groove is shown. Groove 91 in seat face 61, and around port 71, has plane sides 100, 101 between which is the intersection 102 at the bottom of the groove. Sides 100, 101 are disposed at an angle of 90° one to the other, and are each at an angle of 45° with seat face 61, so that the groove is triangular. Intersection 102 is not a right angle, but is curved concavely as shown in Figure 3 in order to be easily flushed out. The triangular groove 91 has only half the volume of a rectangular groove of the same width and depth.

In Figure 3 groove 91 is shown at its juncture with the recess part 93 of the groove. Groove 91 is of the same triangular shape at all of its parts around port 71. The recess part 93 of the groove is cylindrical as best shown in Figure 2, and has a substantially flat bottom, as shown, in the preferred embodiment, but may take other forms. Recess 93 is usually made by drilling out to the depth of intersection 102.

The edges 104, 105 of the groove are rounded in order to avoid tears and burrs which occur when ordinary square sided and sharp angled sealing grooves are exposed to the sliding of the gates thereover in opening and closing the valve. Such burrs and tears of the metal at the sides of the sealing grooves may prevent proper flush seating between the seat face and gate, and also tend to hasten buildup in the groove and prevent flushing thereof. The edges of recess 93 are preferably rounded as shown.

The particular shape of the triangular sealing groove depends to some extent on its location in the equipment and on the nature of the sealing material to be used. The grooves must have sufficient cross sectional area to enable the sealing material to dependably flow therein without self-plugging of the sealing material. The tops of the grooves must be wide enough to insure an abundance of sealing material at the groove edges 104, 105 so that a reliable seal will be formed. The grooves must have a cross sectional shape which will prohibit clinging of sludge in the grooves and will permit efficient fluid washing of the grooves. The grooves must have a minimum volume as compared with their sealing area (width of the grooves) so that loss of sealing material upon exposure of the grooves to the line fluid will be minimized.

The width of the grooves must be kept relatively narrow so that the grooves may function properly at narrow surfaces, e.g. at the sides 107, 108 of port 71 where the seat face spaces between port 71 and the sides of the seat are limited. It is necessary to have a substantial surface width to each side of the groove in order to hold the sealing material in the groove.

The seat face 61 is usually relieved at the part 110 thereof between the sealing groove and the seat flow port 71. This relief insures that the fluid pressure in the port will uniformly enter the entire circle of the sealing groove, but may be omitted.

As noted earlier, the sealing grooves 88 around seat necks 66, 68 in recesses 67, 69, respectively, are not made of triangular or V shape because they are protected from line fluid and are never exposed while the valve is in operation.

The valve shown and described functions in the usual manner. In Figure 1 the gates 51, 52 are shown in the closed position, the upper sealing plate areas of the gates flushly seated on the seat faces around the inner ends of ports 71, 72 to close them. Sealing material is supplied from either of the reservoirs 80, 81 in response to the pressure of fluid in passage 12 and/or passage 13. For illustration of the operation, say fluid under pressure is in passage 12 and the valve is closed. Fluid at a lower pressure is in passage 13 or that passage may be empty. Gate 51 is urged to unseat by the pressure in passage 12 and the pressure enters chamber 16. The pressure in chamber 16 becomes substantially equal to the pressure in passage 12 and causes gate 52 to be firmly seated at seat face 62. The pressure in chamber 16 enters both reservoirs at their open upper ends and acts downwardly on the upper surfaces of pistons 82, and 83, but since the outlets from reservoir 80 at its sealing grooves are at the same pressure as exists above piston 82, no sealing material is made to flow from reservoir 80 to the sealing grooves. On the other hand, the sealing grooves associated with reservoir 81 are at the lower pressure of passage 13, so that piston 83 moves downwardly under the influence of the pressure differential thereacross to cause sealing material to flow through ports 85, 87 of seat 64 to groove 88 of seat 64, and through ports 85, 90 of seat 64 and jumper 94 of gate 52 to sealing groove 91 of seat 64. When a higher pressure exists in passage 13 than in passage 12, the sealing system works in the opposite direction and sealing material is supplied from reservoir 80 to the sealing grooves 88, 91 of seat 63. The valve is, therefore, capable of reversible operation, and the sealing is automatic regardless of the direction of operation.

When the valve is opened, the gates are moved to align ports 54, 55 thereof with passages 12, 13 and ports 71 72. The jumpers 94 in each gate are moved out of their position of communication with grooves 91 and ports 90 after their initial opening movement, and thereafter sealing material can flow from neither reservoir until such time as the gates are again moved to closed position. During the opening movement of the gates, grooves 91 are exposed to line fluids and pressure which enters ports 54, 55, and a washing action of the grooves 91 by the line fluid takes place, particularly at the lower parts of the grooves. That is the groove part which is most likely to have been plugged by sediment or sludge, previously discussed, and the washing action is made very efficient by the triangular or V shape of grooves 91. Unlike the rectangular grooves of older equipment, the sloped sides of the grooves 91 direct the flow of the line fluid entering ports 54, 55 to the base of the grooves at intersection 102 and the fluid thus washes the grooves clean. Since the grooves have no parallel side walls or right angle corners tending to hold the sediment or sludge in the grooves, the washing action becomes very effective. In the case of the rectangular grooves, the line fluid had little washing action, being directed to pass over the grooves instead of entering them.

A further improvement in performance of the valves resides in the provision of the groove recesses 93 at the points where sealing material is supplied to the grooves through jumpers 94 from ports 90. In earlier valves of this type, it has been found that effective sealing around the flow ports has been prevented because the jumpers 94 did not provide communication between ports 90 and the grooves until the valve was substantially entirely closed, i.e. until the gates were at their lowest position against stops 115, 116 at the bottom of chamber 16. Recesses 93 provide this communication between ports 90 and the grooves somewhat earlier, and before the valve is entirely closed so that the sealing grooves become filled with sealing material before the gates are entirely down. The reason for the failure to seal when recesses 93 were not provided was because, due to build-up of sludge on the tops of stops 115, 116 the gates could not be moved to their lowest position in contact with the stops at their lower ends, and adequate communication from ports 90 to grooves 91 was never provided by the jumpers 94 in the gates.

In addition, allowing sealing material to flow into the sealing grooves before the valve is entirely closed gives a last minute wash or flush to the grooves with the sealing material so that it is insured that the grooves will be clean after the valve is closed and that effective fluid-tight sealing will result.

The valves are provided with means, not shown, for introducing sealing material to reservoirs 80, 81 from the exterior of the valve, which is customary in this type of valve. In this connection, the V-grooves permit a greater number of operations of the valves before the reservoirs must be refilled because less of the sealing material is lost when the sealing grooves are exposed on opening because of the smaller sealing groove volume relative the sealing groove width than with the rectangular grooves. Therefore, the valves having triangular sealing grooves are more efficient in sealing material usage than are valves having rectangular sealing grooves.

It is contemplated that this invention shall encompass other valves and equipment utilizing plastic sealing systems similar to that herein shown and described, the sealing systems of such equipment being of the same principles as are here disclosed regardless of other forms of the equipment. Therefore, although only a preferred embodiment of the invention has been shown and described, many modifications thereof may be made by a person skilled in the art without departing from the spirit of the invention, and it is intended to protect by Letters Patent all forms of the invention falling within the scope of the following claims.

I claim:

1. An automatic self-sealing lubricated valve comprising, a valve body having a chamber therein, a flow passage through said body intersecting said chamber, closure means within said chamber for controlling fluid flow through said flow passage between open and closed positions thereof, means for operating said closure means from the exterior of the valve, reservoir means in the valve for containing a supply of flowable sealing and lubricating material, a seal comprising a first surface having a sealing groove of generally triangular cross sectional form therein spaced from an edge thereof, a second surface abutting said first surface at the side of said groove away from said edge and overlying said groove and edge, said first surface being slightly relieved between said groove and edge to be closely spaced from said second surface but not in abutment therewith, said relieved portion of said first surface between said groove and edge exposing said sealing material in said groove to fluid pressures at said edge whereby said sealing material is pressured to form a seal at said groove, means and ports for causing said material to flow from said reservoir means to said seal surfaces and said groove to form a seal across the groove between said surfaces when the valve is closed, said surface having said groove being relatively moved to a non-engaged position when the valve is not closed and there being exposed to the line fluid in said flow passage, and said triangular form of said groove having angular sides preventing the adherence therein of detritus and permitting the line fluid to wash the groove clean each time the valve is opened.

2. The combination of claim 1, the valve being a gate valve having removable seats.

3. The combination of claim 1, the groove being rounded at its apex and opening to provide a smooth flow path for line fluid flowing laterally and/or longitudinally thereacross to wash out the groove.

4. The combination of claim 1 the valve having a seat at opposite sides of said chamber around said flow passage, each of said seats having a surface comprising said first surface of said seal, said closure means including gates each of which has a surface cooperating with said seat surfaces and forming said second surface of said seal, said triangular groove being formed in each of said seats around said flow passage, ports extending from the said reservoir means to each said seat surface spaced above the said groove therein, groove flow means in said gate surfaces for connecting each said port with the groove therebelow when the valve is entirely closed to permit flow of sealing material from said reservoir means to the grooves to seal around said flow passage at the said seats.

References Cited in the file of this patent

UNITED STATES PATENTS

| | | |
|---|---|---|
| Re. 23,957 | Volpin | Mar. 1, 1955 |
| 1,994,618 | Nordstrom | Mar. 19, 1935 |
| 2,042,066 | Leach | May 26, 1936 |
| 2,230,600 | Olson | Feb. 4, 1941 |
| 2,433,638 | Volpin | Dec. 30, 1947 |
| 2,605,078 | Volpin | July 29, 1952 |
| 2,653,789 | Eichenberg | Sept. 29, 1953 |